United States Patent [19]
Dopp

[11] Patent Number: 4,791,034
[45] Date of Patent: Dec. 13, 1988

[54] SEALING SLEEVE

[75] Inventor: Robert B. Dopp, Madison, Wis.

[73] Assignee: Rayovac Corporation, Madison, Wis.

[21] Appl. No.: 12,999

[22] Filed: Feb. 10, 1987

[51] Int. Cl.⁴ .................... H01M 4/00; H01M 2/08
[52] U.S. Cl. ........................... 429/27; 429/174; 429/185
[58] Field of Search ................ 429/27, 179, 185

[56] References Cited

U.S. PATENT DOCUMENTS

| | | |
|---|---|---|
| 3,723,184 | 3/1973 | Stark .................... 429/174 X |
| 3,904,438 | 9/1975 | Naylor et al. .................... 429/185 |
| 4,258,108 | 3/1981 | Glaser .................... 429/185 X |
| 4,656,104 | 4/1987 | Tucholski .................... 429/185 |

Primary Examiner—Brian E. Hearn
Assistant Examiner—Stephen J. Kalafut

[57] ABSTRACT

A sealing sleeve for the interface of metal components of electrochemical cells and the like is disclosed. A highly dependable seal substantially preventing fluid passage results from use of the disclosed sleeve having ridges protruding inwardly of its inner surface and having a flared region wherein the sleeve's cross sectional area decreases with distance from its flared open end.

22 Claims, 3 Drawing Sheets

SEALING SLEEVE

FIELD OF THE INVENTION

This invention relates generally to sealing sleeves, and to their use as components of products such as electrochemical cells, and more particularly to an improved seal grommet for small electrochemical cells. Such grommets provide improved seal integrity and simplified cell assembly.

BACKGROUND OF THE INVENTION

The sealing of metal components of a fluid-containing product wherein fluids are to be maintained within the product, such as a fluid electrolyte-containing battery, requires particularly effective design of sealing members present at the interface of components. Otherwise, the interface might provide a passage for undesirable fluid leakage.

The recent increase in small electrically-powered devices has increased the demand for very small electrochemical cells, usually disc-like or pellet-like in appearance. These cells, often called "button cells", usually have diameters ranging up to about 1.0 inch and heights ranging up to about 0.60 inches. Because of the minute size of these cells each cell component must be manufactured with substantial precision to meet the geometric tolerances both of the device into which the cell will be placed and to provide a good fit with other components, thus reducing leakage of corrosive electrolytes. A poor seal may impede the effectiveness of a battery and/or allow leakage which may be damaging to devices into which the battery is placed. Because button cells and the like are being utilized in increasingly more sophisticated devices, it is becoming increasingly more important to provide a substantially leakproof design. Accordingly, several methods to provide leakproof button cells have been utilized. However, to date the attempts to provide leakproof designs have not been entirely successful.

An example is shown in Jaggard, U.S. Pat. No. 3,897,265 (which recently reissued as U.S. Pat. No. Re. 31,413). Jaggard discloses a method of sealing zinc-air electrochemical button cells which utilize "a single insulating and sealing member having an L-shaped cross-section," (Claim 1, Col. 7, lines 41-42). As disclosed in Jaggard, the portion of the sealing grommet which contacts the outer anode can (i.e.. the long side of the L) has a uniform thickness. Variations of such L-shaped sealing grommets, including "J-shaped" sealing grommets are known and utilized in the industry. Such well known seal grommets, while providing some resistance to cell leakage, cause several problems during the assembly of button cells.

Because of their shape, in order to prevent leakage of electrolyte, grommets such as disclosed in Jaggard must be manufactured according to very strict specifications. Such exacting manufacturing specifications in a plant setting often result in equipment failure, the rejection of a large quantity of manufactured parts because of only minor defects, or in a bottleneck in the entire button cell manufacturing process.

The straight side wall of prior art grommets mandates that other cell components which contact the grommet, such as the sidewalls of the cathode cannister, be manufactured to within very narrow tolerances. This may necessitate that cell parts only slightly damaged during manufacture or handling, be rejected in order to reduce the possibility of leakage.

It is common during mass production of small electrochemical cells to effect a preliminary assembly of the various components of the cells prior to the final closing of the cell. Final closing may involve applying sufficient pressure to press together appropriate components of the cell, together with substantially simultaneous crimping of cannister edges to lock components into place. During preliminary assembly, the degree to which component parts are pressed together prior to final sealing varies widely from cell to cell causing the cells to be of non-uniform height prior to final closing. This lack of uniformity may render the final sealing operation less efficient than would be the case if the preassembled cells were of uniform height.

When electrolytic fluids and the like are present within the cells, it is possible for fluid to splash out during the preliminary assembly process. This may be caused by a number of mechanisms including for instance, distortion of components or of container walls and the like within the cell causing inadvertent indentation of surfaces or insertion of members into the volume occupied by fluids, thus forcing the fluids out of the cell. For instance, pressure on the anode cap of a battery cell may cause the base of the cap to indent into the inner volume of the anode thus forcing anode fluids out of the cell. Also, pressure at interfaces between anode and cathode components may force cathode components into the anode volume causing the same result. Splashed out electrolyte may cause cells to stick to automated equipment, for instance, to a closing die during final closing of the cell. This may necessitate shutting down the automated cell closing equipment in order to clear the die. Moreover, cell electrolyte often discolors the outside of the cell creating associated problems with consumer appeal.

Accordingly, it is an object of the present invention to provide a reliable sealing member which is effective to retard the passage of fluids at the interface of component parts of fluid-containing products wherein the sealing member is sandwiched between the component parts.

It is another object of the invention to provide a grommet for use in batteries, and particularly for use in small electrochemical cells such as button cells, which allows for simplified and efficient cell assembly.

It.is another object of the invention to provide a grommet for use in batteries, and particularly for use in small electrochemical cells such as button cells, which allows economical mass production of the cells with low incidence of equipment shut down.

It is another object of the invention to provide battery cells which effectively resist leakage of electrolyte.

It is yet another object of the invention to provide flexible sealing members for battery cells which retard the splash out of battery fluids during assembly.

These and other objects will become apparent from a thorough reading of the instant disclosure.

SUMMARY OF INVENTION

The present invention provides a sealing sleeve of substnatially uniform thickness having at least one ridge, which is not mechanically supported, protruding inwardly of its inner surface, wherein said sleeve is capable, when contacted by another surface in a manner and at a pressure sufficient to distort at least one of its inwardly-protruding ridges, of forming a seal which substantially prevents the passage of fluids between said sleeve and said other surface.

The invention further provides a sealing sleeve whose sidewall flares outwardly in a flared region of the sleeve in such a manner that the cross sectional area of said sleeve defined by said sidewall is larger at one open end of said sleeve than are the cross sectional areas defined by said sidewall at other positions along the sleeve, and in such a manner that cross sectional areas in said flared region decrease progressively as distance from said open end increases.

In certain preferred embodiments, a substantially cylindrical sealing sleeve of substantially uniform thickness is provided having a grooved flange portion at one open end capable of engaging an electrolyte-containing battery member if said member were inserted within the sleeve, and at least one mechanically unsupported ridge protruding inwardly of the inner surface thereof; wherein said sleeve is capable, when contacted by the surface of said electrolyte-containing battery member in a manner and at a pressure sufficient to distort at least one ridge, of forming a seal which substantially prevents the passage of fluids between said sleeve and said electrolyte-containing battery member; wherein said grommet includes a flared region extending from the open end opposite said grooved flange to the beginning of an unflared region which extends from the open end which includes said grooved flange, wherein diameters of circular cross sections taken at positions within the unflared region are substantially similar, and wherein diameters of circular cross sections for the flared region progressively decrease from the flared open end to the beginning of the unflared region.

The present invention also provides an electrochemical cell comprising an electrolyte-containing member having a side wall and a base, said member being at least partially covered and surrounded by a cannister having a side wall which substantially encircles the side wall of said electrolyte-containing member, said cell further including a sealing grommet of substantially uniform thickness, at least part of which is between and in sealing contact with both the side wall of said electrolyte-containing member and the side wall of said cannister, wherein said grommet has at least one mechanically unsupported ridge protruding away from the inner surface thereof and wherein at least one ridge contacts the side wall of said electrolyte-containing member at a pressure which is both sufficient to distort the ridge and sufficient to form a seal between said grommet and said electrolyte-containing member which is capable of substantially preventing the passage of fluids.

Without intending to be bound by theory, it is believed that button cells can be more easily constructed and made more resistant to leakage during storage if provided with a grommet which is flared or into which a series of small ridges have been molded. The series of ridges are most likely responsible for the reduction in cell leakage due to the increased degree of "cold flow" which the ridges provide to the grommet material. In view of the ridges, harder material may be used for the grommet while desired cold flow characteristics are maintained. The microscopic property of plastics known as "cold-flow" may allow plastics to modify their shape to that of surrounding nonuniformities when forces are exerted upon them. Hence, grommet material may flow into tiny flaws in a neighboring surface filling the flaw and foreclosing its becoming a conduit for passage of fluid. An improved seal results.

Figure 5:
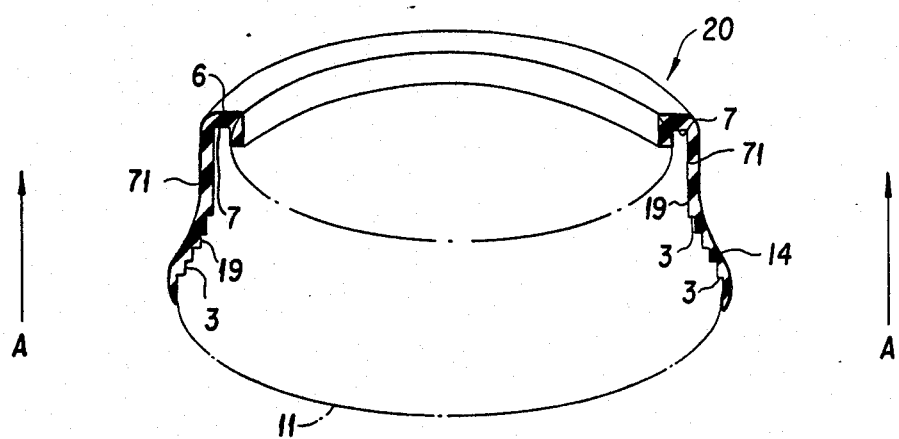
FIG. 5 is a cross sectional view of a preferred grommet for use in a preferred electrochemical cell such as that shown in FIG. 1.

There is shown in FIG. 5 a flexible battery grommet for use in small electrical cells such as cylindrical button cells and the like. The grommet may be comprised of any material capable, when pressed against another material with sufficient force, of forming a seal which substantially retards the passage of fluids between the grommet and the other material. Grommets comprising flexible plastics, preferably a hard plastic would be appropriate. Preferably the grommet is comprised of a material selected from the group consisting of nylon, polyester, polypropylene, polysulfone, polyphenylene ether based resins, and tetra fluoroethylene compounds such as polyethylene-tetrafluoroethylene copolymer.

Figure 3:
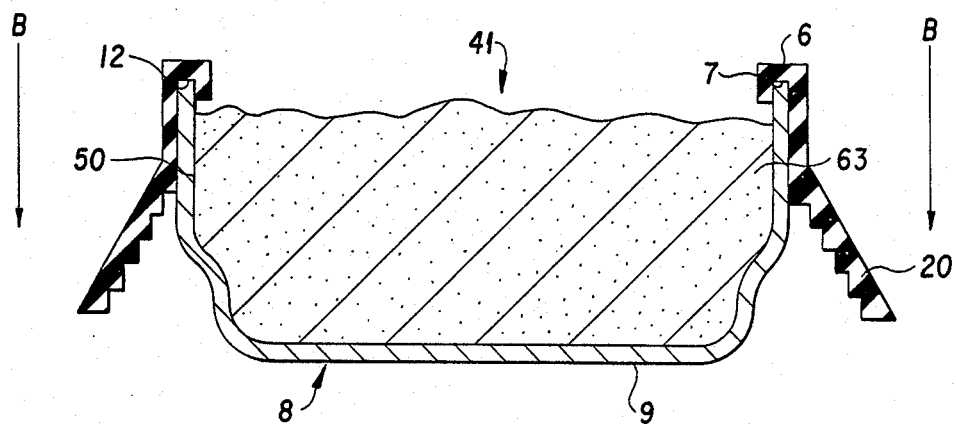

It is preferred that the grommet 20, which is of substantially uniform thickness, includes a grooved flange portion 6 having groove 7 for receiving the edge of an electrolyte-containing cannister such as top edge 12 of anode 8, shown in FIG. 3. The grommet includes unflared portion 71 wherein circular cross sections taken along line A are of substantially constant diameter. This unflared region extends from the open side of the grommet having said flange portion 6 and extends until meeting a flared region 14 wherein circular cross sections taken along line A are of progressively decreasing diameter from open end 11 which is opposite flange portion 6 until the beginning of unflared region 71. Although the entire grommet may be flared, if desired, the ratio of flared region to unflared region is preferably from about 10:1 to about 1:10 and more preferably from about 3:1 to about 1:3. The flared region may form an angle, relative to the position the unflared region would occupy if it extended to the height of the flared region, of from about 5° to about 30° and, preferably, from about 5° to about 15°. At least one mechanically unsupported ridge 3 protrudes inwardly of grommet 20 in the flared region.

Figure 2:
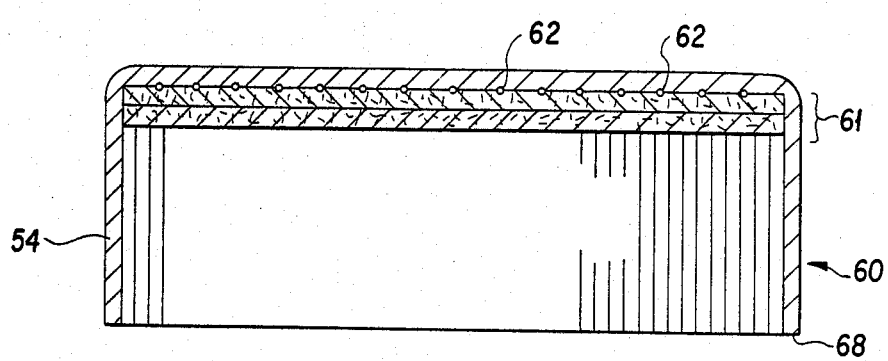
FIGS. 2 and 3 are cross sectional views of the cathode cannister and anode, respectively of the cell shown in FIG. 1.

The grommet shown in FIG. 5 is particularly useful for sealing the anode and cathode portions of a button cell such as that shown in FIGS. 3 and 2 respectively. During assembly of the cell, edge 12 which defines the open end of anode 8 is inserted into groove 7 of grooved flange portion 6 of grommet 20. Sidewall 50 of anode 8 is generally of circular cross section along line of sight B, said circular cross section having diameters slightly smaller than the diameters of corresponding circular cross sections of the side wall 54, of cathode can 60 shown in FIG. 2. Cathode can 60 includes as a lid thereto cathode assembly 61. In a preferred zinc/air cell, cathode assembly 61 includes openings 62 through which air may pass.

In a preferred zinc/air cell, (see FIG. 3) anode 8 contains electrolyte 63 which is capable of splashing out of the cell during preliminary assembly unless proper preventative measures are taken and which is capable of leaking from the battery absent measures such as the instantly disclosed grommet for preventing such leakage. Preferably the electrolyte comprises zinc powder and an aqueous potassium hydroxide solution, for instance, a 30% potassium hydroxide solution.

Figure 4:
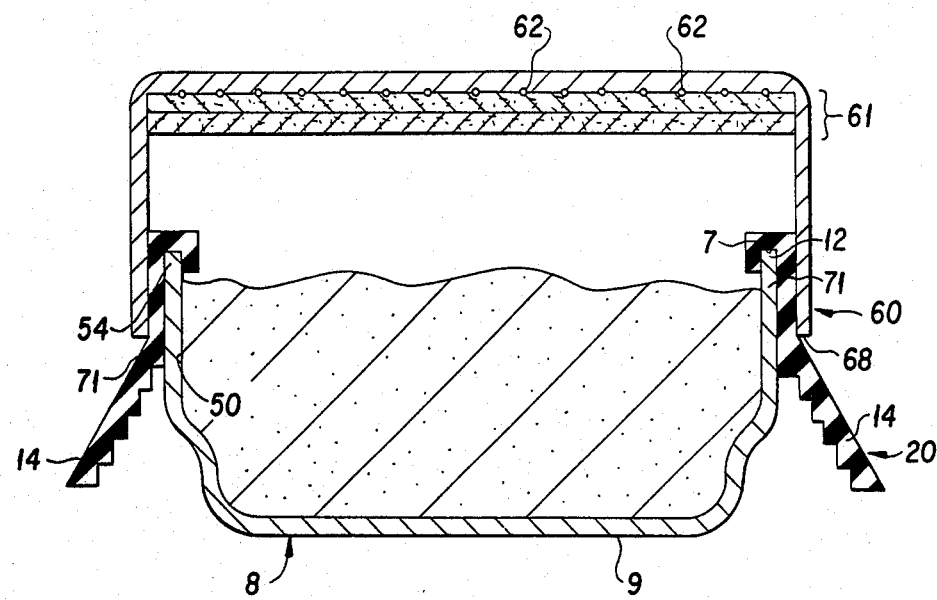
FIG. 4 is a cross sectional view of an unsealed electrochemical cell capable of being sealed into the completed cell shown in FIG. 1 at a stage of production wherein the cathode cannister of FIG. 2 has been preliminarily assembled with the anode of FIG. 3 but wherein final sealing has not yet taken place.

FIG. 4 shows selected component parts of a preferred zinc/air button cell preliminarily assembled in accordance with the instant invention but not finally closed and sealed. It should be noted that the cathode can 60 slides easily over the unflared region 71 of grommet 20 but is stopped short of totally closing upon anode 8 by the flared portion 14 of grommet 20 which provides resistance to the further advancement of edge 68 of can 60. This greatly aids mass production of the cell as similar grommets 20 cause can 60 to progress to a substantially similar point along anode 8 for each cell involved in mass production. This facilitates mass production by allowing the preliminarily assembled cells to be of substantially uniform height when delivered to a closing dye. The closing die presses the assembly shown in FIG. 4 together and crimps can 60 and grommet 20 together to form the finished cell shown in FIG. 1 in a process that is substantially instantaneous. Splash out of electrolyte is substantially prevented at the closing die by virtue of the crimping process being substantially simultaneous with the pressing together of the component parts.

The splash-out of the electrolyte, which can occur more easily during the preliminary assembly process, is greatly reduced by the flared portion 14 of grommet 20 stopping can 60 from completely closing upon anode 8. The springiness of flared region 14 helps prevent pressure upon can 60 or anode 8 from denting portions of either into the electrolyte region which can force electrolyte out of the cell. Moreover because can 60 does not fully engage anode 8 during preliminary assembly, the pressure of either on the other does not result in deformation of either into the electrolyte-containing volume, another mechanism by which electrolyte may be splashed out. Finally, splash-out may be reduced by the presence, at the preliminary assembly stage, of some space between the cathode assembly and electrolyte volume such that indentation of parts into the electrolyte volume need not create enough pressure to force electrolyte out of the cell.

Figure 1:
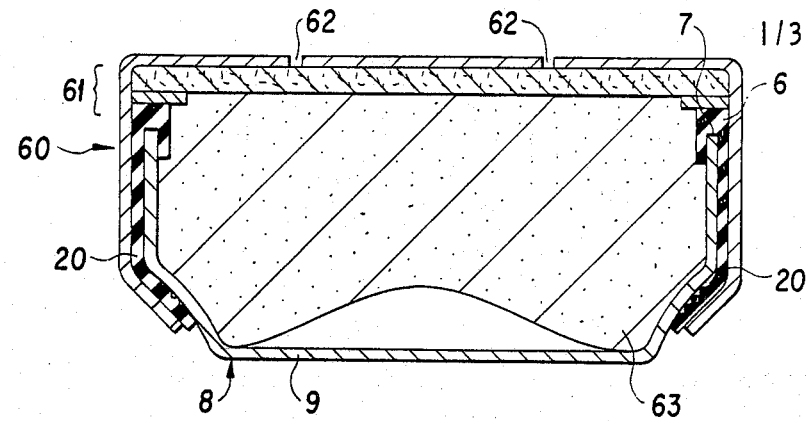
FIG. 1 is a cross sectional view of a preferred electrochemical cell made in accordance with the instant invention.

After the cell is finally closed in the closing dye, it may take on cross sectional configuration similar to that shown in FIG. 1. After final closing, the ridges along inner surface 19 of grommet 20 engage the outer surface of anode 8 at a pressure such that the ridges are deformed thereby.

Figure 6:
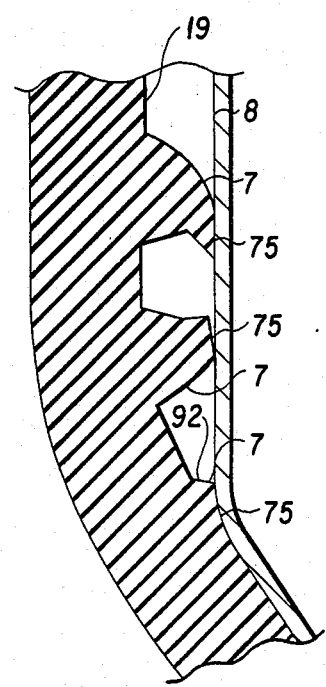
FIG. 6 is an exaggerated cross sectional view of the ridged portion of a ridged grommet made in accordance with the invention wherein the ridges have been distorted by pressure from a foreign surface.

In FIG. 6, successive ridges 7 of grommet 20 are shown wherein the pressure of anode 8 against ridges 7 compresses ridges 7 to form flattened regions 75 which contact anode 8 with great compressive force giving the ridges added ability to cold flow into tiny cracks, crevices and ther minor flaws on the outer surface of anode 8. Thus such cracks, crevices, or flaws are substantially sealed against passage of fluid therethrough. Preferably, most if not all ridges are substantially compressed completely to inner surface 19, such as illustrated by substantially flattened ridge 92. However, it is believed that a good seal results when any ridges are compressed, even if not totally compressed to inner surface 19.

While the present invention is susceptible to various modifications and alternatives, the drawings, descriptions and examples are specifically directed to a zinc/air electrochemical cell as one preferred embodiment. It is to be understood, however, that the present invention is broadly applicable to a sealing grommet generally and in preferred embodiments to other sizes and types of electrochemical cells. For example, the invention is equally applicable to other metal/air cells, mercury, silver, and manganese oxide cells or to differently shaped or larger cells, batteries and the like.

Because more cold flow is induced by the presence of ridges, the novel grommets of the present invention can be made of moldable plastic having low cold flow characteristics. Such plastics often have more desirable levels of strength than may be reproducible in materials of higher cold flow. In the zinc air electrochemical cell, the preferred grommet comprises a plastic material such as nylon. Other preferred materials are polyester, polypropylene, polysulfone, polyphenylene ether-based resins, and tetrafluoroethylene compounds such as polyethylene-tetrafluoroethylene copolymers.

Zinc-air electrochemical cells may be assembled according to the well-known methods utilized by the industry. For instance, the grommet is preferably first coated with a sealant. Preferred sealants include sealants comprised of fatty polyamide mixtures, silicone/-fatty polyamide mixtures, bitumin, bitumin/silicone mixtures, and polyurethane. After coating, the grommet and anode are joined into a top-grommet assembly, usually by interference fit. The anode material and the electrolyte are then placed into the top-grommet assembly. Next the cathode assembly comprising the cathode can and containing a diffuser, an air cathode sub-assembly, and a retaining ring is placed over the anode assembly. The joined assembly unit may be forced into a closing die which draws in the side walls while folding the cathode can over about one-third of the radius of the anode base. During this closing operation, the plastic grommet is compressed against both the outer cathode cannister and the anode. A sealant is preferred but not necessary to the construction of the cell and may add to the integrity of this mechanical seal.

The improvement the present invention provides for the leakage problem seen in electrochemical button cells is illustrated in the following comparative test. Two lots of zinc air button cells were constructed. Cells in Lot A utilized the grommets of the prior art while cells in Lot B utilized grommets of the present invention. In order to insure that sealant properties did not bias the comparison, no sealant was used with either lot. Use of sealant should further improve performance. After two months storage at room temperature, the cells were examined both visually and under a microscope (at 15 magnifications). Cells of the present invention were found to be more resistant to leakage than cells of the prior art. In fact, all of the prior art cells visually exhibited substantial leakage while, in cells of the present invention, only very slight leakage was evident even when examined microscopically.

TABLE I
LEAKAGE AFTER TWO MONTHS STORAGE AT ROOM TEMPERATURE

| | Number of Cells | Number with no Leakage | With Slight Leakage | With Moderate or Heavy Leakage |
|---|---|---|---|---|
| CONTROL(Visual) | 14 | 0 | 0 | 14 |
| CONTROL(15×) | 14 | 0 | 0 | 14 |
| RIDGED(Visual) | 24 | 20 | 4 | 0 |
| RIDGED(15×) | 24 | 12 | 12 | 0 |

The foregoing description of the invention is set forth by way of illustration only, and not by way of limitation. The specific terms and descriptions used herein are not intended to exclude the wide variety of alternatives which those of ordinary skill in the art will readily recognize as available for the practice of the instant invention as defined by the following claims.

What is claimed is:

1. A sealing sleeve of substantially uniform thickness having at least one mechancially unsupported ridge protruding inwardly of its inner surface, wherein said sleeve is capable, when contacted by another surface in a manner and at a pressure sufficient to distort at least one of its inwardly-protruding ridges, of forming a seal which substantially prevents the passage of fluids between said sleeve and said other surface.

2. The sealing sleeve according to claim 1 wherein said sleeve is of substantially circular cross section.

3. The sealing sleeve according to claim 2 wherein the sleeve is a battery grommet and includes a grooved flange portion at one open end.

4. The sealing sleeve according to claim 1 wherein said sleeve comprises a flared region extending from one open end in such a manner that cross sectional areas, defined by the sidewall of said sleeve in said flared region, progressively decrease as distance from said open end increases.

5. The sealing sleeve according to claim 4, further having an unflared region wherein cross sectional areas are substantially constant at all the positions along said unflared region, wherein the ratio of flared region to unflared region is about 1:10 to about 10:1.

6. The sealing sleeve according to claim 5 wherein the ratio of flared region to unflared region is about 1:3 to about 3:1.

7. The sealing sleeve according to claim 4 wherein said flared region forms an angle of about 5° to about 30° relative to the position said unflared region would occupy were it extended to the height of the flared region.

8. The sealing sleeve according to claim 7 wherein the ratio of flared region to unflared region is about 1:3 to about 3:1.

9. The sealing sleeve according to claim 1 wherein said sleeve is comprised of material selected from the group consisting of nylon, polyester, polypropylene, polysulfone, polyethylene-tetrafluoroethylene copolymers, and polyphenylene ether based resins.

10. The sealing sleeve according to claim 1 wherein said sleeve includes 3 to 7 ridges.

11. The sealing sleeve according to claim 7 wherein said flexible material is selected from the group consisting of nylon, polyester, polypropylene, polysulfone, polyethylene-tetrafluoroethylene copolymer and polyphenylene ether based resins.

12. A sealing sleeve according to claim 1 wherein said flexible material comprises a hard plastic material.

13. An electrochemical cell comprising an electrolyte-containing member having a side wall and a base, said member being at least partially covered and surrounded by a cannister having a side wall which substantially encircles the side wall of said electrolyte-containing member, said cell further including a sealing grommet of substantially uniform thickness, at least part of which is between and in sealing contact with both the side wall of said electrolyte-containing member and the side wall of said cannister, wherein said grommet has at least one mechanically unsupported ridge protruding away from the inner surface thereof and wherein at least one ridge contacts the side wall of said electrolyte-containing member at a pressure which is both sufficient to distort the ridge and sufficient to form a seal between said grommet and said electrolyte-containing member which is capable of substantially preventing the passage of fluids.

14. The cell according to claim 13 wherein the cell is a zinc-air electrochemical cell.

15. The electrochemical cell according to claim 13 wherein the cell is a button-type cell.

16. The electrochemical cell according to claim 13 wherein said grommet includes a grooved flange at one open end and, in its unpressured configuration, a flared region extending from the opposite open end to the beginning of an unflared region which extends from the groove flange end, wherein cross sectional areas taken at various positions along the unflared region are substantially equal and wherein cross sectional areas for the flared region progressively decrease from the flared open end to the beginning of the unflared region.

17. The electrochemical cell according to claim 16 wherein most of the said ridges are in said flared region and wherein the inner surface of said sleeve is coated with a sealant.

18. The electrochemical cell according to claim 13 wherein the grommet includes a grooved flange portion capable of receiving said electrolyte-containing member.

19. The electrochemical cell according to claim 13 wherein the grommet is comprised of a hard plastic material.

20. The electrochemical cell according to claim 13 wherein the grommet is comprised of a material selected from the group consisting of nylon, polyester, polypropylene, polysulfone, polyethylene-tetrafluoroethylene copolymer, and polyphenylene ether based resins.

21. A substantially cylindrical or disc-shaped electrochemical cell comprising an electrolyte-containing anode having a side wall of substantially circular cross section, a base, and an open-end substantially opposite said base defined by the edge of said side wall, said anode being at least partially covered and surrounded by an electrically conductive cathode cannister having a lid which acts as the cell's cathode assembly and a side wall which substantially encircles the side wall of said anode; wherein the electrochemical cell further comprises a flexible sealing member of substantially circular cross section which is open at substantially uniform opposite ends and has, at one end, a grooved flange portion for receiving the edge of the side wall of said anode, at least part of said grommet being between the side wall of said anode and the side wall of said cathode cannister and in sealing contact with both; wherein said grommet has at least one ridge of flexible material protruding inwardly of its inner surface, wherein said ridge or ridges contact the outer surface of said side wall of said anode at a mechancially unsupported pressure sufficient to distort said ridge or ridges out of their unpressured configuration; wherein said grommet in its unpressured configuration includes a flared region extending from the open end opposite said grooved flange to the beginning of an unflared region which extends from the open end which includes said grooved flange wherein diameters of circular cross sections taken at various positions in the unflared region are substantially equal and wherein diameters of circular cross sections for the flared region progressively decrease from the flared open end to the beginning of the unflared region.

22. A substantially cylindrical sealing sleeve of substantially uniform thickness for electrochemical cells having a grooved flange portion at one open end capable of engaging an electrolyte-containing battery member if said member were inserted within the sleeve, and a least one mechanically unsupported ridge protruding inwardly of the inner surface thereof; wherein said sleeve is capable, when contacted by the surface of said electrolyte-containing battery member in a manner and at a pressure sufficient to distort at least one ridge, of forming a seal which substantially prevents the passage of fluids between said sleeve and said electrolyte-containing battery member; wherein said grommet includes a flared region extending from the open end opposite said grooved flange to the beginning of an unflared region which extends from the open end which includes said grooved flange, wherein diameters of circular cross sections taken at positions within the unflared region are substantially similar, and wherein diameters of circular cross sections for the flared region progressively decrease from the flared open end to the beginning of the unflared region.

* * * * *

UNITED STATES PATENT AND TRADEMARK OFFICE
CERTIFICATE OF CORRECTION

PATENT NO. : 4,791,034
DATED : December 13, 1988
INVENTOR(S) : Robert B. Dopp

It is certified that error appears in the above-identified patent and that said Letters Patent is hereby corrected as shown below:

| Column | Line | |
|---|---|---|
| 2 | 63 | Please delete "substnatially" and insert --substantially-- |
| 4 | 33 | Please delete "tetra fluorethylene" and insert --tetrafluorethylene-- |
| 5 | 27 | Please delete "dye" and insert --die--. |
| 5 | 53 | Please delete "dye" and insert --die--. |
| 8 | 13 | Please delete "mechancially" and insert --mechanically--. |
| 8 | 64 | After "a" please insert --mechanically unsupported--. |
| 9 | 4 | delete "mechanically unsupported". |
| 10 | 2 | delete "a" and insert -- at --. |

Signed and Sealed this

Eighteenth Day of July, 1989

Attest:

DONALD J. QUIGG

Attesting Officer      Commissioner of Patents and Trademarks